(12) United States Patent
Kato et al.

(10) Patent No.: US 11,285,823 B2
(45) Date of Patent: Mar. 29, 2022

(54) WIRELESS CHARGING DEVICE FOR VEHICLE AND VEHICLE

(71) Applicant: SUBARU CORPORATION, Tokyo (JP)

(72) Inventors: Takuma Kato, Tokyo (JP); Fumiyuki Moriya, Tokyo (JP); Masakazu Yoshino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/912,259

(22) Filed: Jun. 25, 2020

(65) Prior Publication Data

US 2021/0031639 A1    Feb. 4, 2021

(30) Foreign Application Priority Data

Jul. 29, 2019  (JP) .............................. JP2019-138413

(51) Int. Cl.
| | |
|---|---|
| H02J 50/90 | (2016.01) |
| B60L 53/12 | (2019.01) |
| B60L 53/62 | (2019.01) |
| H02J 50/10 | (2016.01) |
| H02J 7/02 | (2016.01) |
| B60L 53/30 | (2019.01) |

(52) U.S. Cl.
CPC ............. B60L 53/12 (2019.02); B60L 53/305 (2019.02); B60L 53/62 (2019.02); H02J 7/02 (2013.01); H02J 50/10 (2016.02); H02J 50/90 (2016.02)

(58) Field of Classification Search
CPC ....................................................... H02J 50/90
USPC ......................................................... 320/108
See application file for complete search history.

(56) References Cited

U.S. PATENT DOCUMENTS

| | | | | |
|---|---|---|---|---|
| 2013/0285620 | A1* | 10/2013 | Yamamoto ............. | H02J 50/60 320/155 |
| 2016/0241064 | A1* | 8/2016 | Hatakeyama .......... | H02J 50/60 |
| 2016/0261135 | A1 | 9/2016 | Iwabuchi | |
| 2018/0166922 | A1* | 6/2018 | Chung .................... | H02J 50/80 |

FOREIGN PATENT DOCUMENTS

WO    WO 2015/059912 A1    4/2015

* cited by examiner

*Primary Examiner* — Edward Tso
*Assistant Examiner* — Ahmed H Omar
(74) *Attorney, Agent, or Firm* — McGinn I.P. Law Group, PLLC.

(57) ABSTRACT

A wireless charging device for a vehicle includes a mounting unit, a power transmitter, a position detector, and a controller. The mounting unit is to be mounted with a mobile device. The power transmitter wirelessly transmits electric power to a power receiver of the mobile device. The position detector detects a position of the power receiver of the mobile device mounted on the mounting unit. The controller switches between charging modes including a normal mode of allowing charging if the power receiver is positioned in a standard region of the mounting unit, and enlargement modes of allowing the charging also if the power receiver is positioned in an enlarged region outside the standard region. The enlargement modes include a standard current mode in which a standard current is outputted to the power transmitter, and an increased current mode in which a current larger than the standard current is outputted.

18 Claims, 3 Drawing Sheets

WIRELESS CHARGING DEVICE FOR VEHICLE AND VEHICLE

CROSS-REFERENCE TO RELATED APPLICATIONS

The present application claims priority from Japanese Patent Application No. 2019-138413 filed on Jul. 29, 2019, the entire contents of which are hereby incorporated by reference.

BACKGROUND

The technology relates to a wireless charging device for a vehicle that is configured to perform wireless charging of a mobile device, and relates to a vehicle.

In recent years, a wireless charging device that wirelessly transmits charging electric power to a mobile device has been widely used. The wireless charging device is assumed to be used also in a cabin of a vehicle. While the vehicle is traveling, inertial force and vibration occur in the cabin, which can cause deviation of the mobile device on the wireless charging device.

International Publication No. WO 2015/059912 discloses a wireless charging device for a vehicle. If a position of a mobile device is deviated, the wireless charging device moves a power feeding coil in accordance with the mobile device, and resumes charging of the mobile device.

SUMMARY

An aspect of the technology provides a wireless charging device for a vehicle. The wireless charging device is configured to charge a mobile device including a power receiver. The wireless charging device includes a mounting unit, a power transmitter, a position detector, and a controller. The mounting unit is to be mounted with the mobile device. The power transmitter is configured to wirelessly transmit electric power to the power receiver of the mobile device. The position detector is configured to detect a position of the power receiver of the mobile device mounted on the mounting unit. The controller is configured to switch between a plurality of charging modes. The plurality of charging modes switchable by the controller includes a normal mode and a plurality of enlargement modes. The normal mode allows charging in a case where the power receiver of the mobile device is positioned in a standard region of the mounting unit. The plurality of enlargement modes allows the charging in a case where the power receiver of the mobile device is positioned in an enlarged region of the mounting unit. The enlarged region is provided outside the standard region. The plurality of enlargement modes includes a standard current mode in which a standard current is outputted to the power transmitter, and an increased current mode in which a current larger than the standard current is outputted to the power transmitter.

An aspect of the technology provides a vehicle mountable with a wireless charging device that includes a mounting unit to be mounted with a mobile device including a power receiver, and a power transmitter configured to wirelessly transmit electric power to the power receiver of the mobile device. The vehicle includes a control device configured to switch between a plurality of charging modes of the wireless charging device. The plurality of charging modes switchable by the control device includes a normal mode and a plurality of enlargement modes. The normal mode allows charging in a case where the power receiver of the mobile device is positioned in a standard region of the mounting unit. The plurality of enlargement modes allows the charging in a case where the power receiver of the mobile device is positioned in an enlarged region of the mounting unit. The enlarged region is provided outside the standard region. The plurality of enlargement modes includes a standard current mode in which a standard current is outputted to the power transmitter, and an increased current mode in which a current larger than the standard current is outputted to the power transmitter.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIGS. 2A and 2B are diagrams each illustrating a relationship between a position of a mobile device and charging efficiency, in which FIG. 2A illustrates a mounting example in which a mobile device is chargeable in a normal mode, and FIG. 2B illustrates a mounting example in which a mobile device is chargeable in an enlargement mode.

DETAILED DESCRIPTION

In a case of wirelessly charging a mobile device in a cabin of a vehicle, position deviation of the mobile device can result in stop of charging, or delay of charging due to a decrease in charging efficiency. Moreover, if charging is continued in a state where charging efficiency is impaired by the position deviation of the mobile device, an electromagnetic field that leaks from a power transmitter causes heat generation or generation of electromagnetic noise.

It is desirable to provide a wireless charging device for a vehicle and a vehicle that make it possible to address position deviation of a mobile device as appropriate.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

Figure 1:
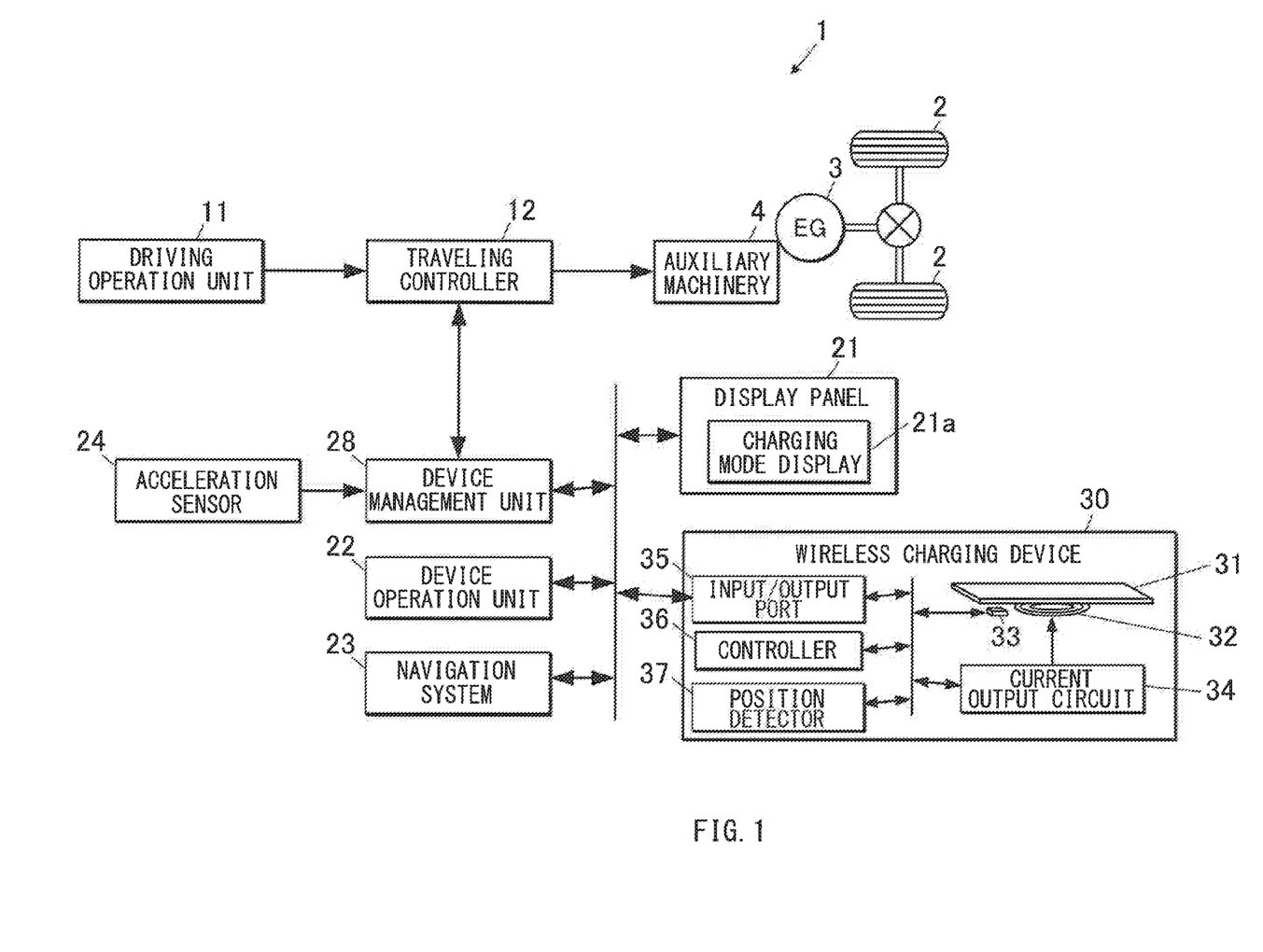
FIG. 1 is a block diagram illustrating a vehicle according to one example embodiment of the technology.

FIG. 1 is a block diagram illustrating a vehicle according to an example embodiment of the technology. A vehicle 1 of the example embodiment may be, for example, an engine-driven automobile, and may include driving wheels 2, an engine 3, auxiliary machinery 4, a driving operation unit 11, and a traveling controller 12. The engine 3 may be an internal combustion engine that drives the driving wheels 2. The auxiliary machinery 4 may be used for operation of the engine 3. The driving operation unit 11 may be operated by a driver in driving. The traveling controller 12 may control the auxiliary machinery 4 on the basis of an operation signal of the driving operation unit 11. It is to be noted that the vehicle 1 is not necessarily driven by the engine 3, and may be an electric vehicle (EV), a hybrid electric vehicle (HEV), or a fuel cell vehicle (FCV), for example.

The vehicle 1 of the example embodiment may further include a display panel 21, a wireless charging device 30, a device operation unit 22, a navigation system 23, an acceleration sensor 24, and a device management unit 28. In one embodiment, the device management unit 28 may serve as a "control device". The display panel 21, the wireless charging device 30, and the device operation unit 22 may be disposed in a cabin of the vehicle 1 to be usable by an occupant. It is possible for the occupant to perform, via the device operation unit 22, various operation inputs related to accessory devices including the display panel 21, the navigation system 23, and the wireless charging device 30.

The device management unit 28 may control accessory devices including the navigation system 23 and the wireless charging device 30. The device management unit 28 may receive vibration information of the vehicle 1 from the acceleration sensor 24. The device management unit 28 may communicate with the navigation system 23 to receive information regarding whether a road on which the vehicle 1 is traveling is an uneven road, such as a railroad crossing. In addition, the device management unit 28 may accept an operation input via the device operation unit 22, and control display of the display panel 21, operation of the navigation system 23, and driving of the wireless charging device 30. The device management unit 28 may include one electronic control unit (ECU), or may have a configuration in which a plurality of ECUs operates in conjugation.

The display panel 21 may be provided with a charging mode display 21a that performs display related to a charging mode of the wireless charging device 30. The charging mode display 21a is able to display, if the charging mode of the wireless charging device 30 is an enlargement mode to be described later, information indicating whether the charging mode is a standard current mode or an increased current mode. In addition, the charging mode display 21a may be able to display information indicating whether the charging mode is a normal mode or the enlargement mode.

The wireless charging device 30 may be an accessory device to be mounted on a vehicle, and performs wireless charging of a mobile device. The wireless charging device 30 may include a mounting unit 31, a power transmitter (e.g., a power transmitting coil) 32, a communicator 33, a current output circuit 34, an input/output port 35, a controller 36, and a position detector 37. The mounting unit 31 is to be mounted with the mobile device. The power transmitter 32 may be disposed below the mounting unit 31, and may perform power transmission by an electromagnetic action. The communicator 33 may communicate with a charging controller of the mobile device. The current output circuit 34 may output a current to the power transmitter 32. To the input/output port 35 may be coupled a signal line for communication with the device management unit 28. The position detector 37 detects a position of a power receiver 82 (see FIG. 2A) of the mobile device.

The controller 36 may be, for example, a microcomputer, and may perform a predetermined control process by executing a control program by a central processing unit (CPU). The controller 36 may perform communication with the device management unit 28, an input process of a detection result from the position detector 37, a communication process with the charging controller of the mobile device via the communicator 33, and output control of the current output circuit 34, for example.

The position detector 37 may detect in which region on the mounting unit 31 the power receiver 82 (see FIG. 2A) of the mobile device is present. The power receiver 82 may be, for example, a power receiving coil. The detection may be performed by any of various methods. For example, it is possible to apply a detection method using a sensor that detects proximity of a target, such as an optical sensor, or a detection method based on field intensity of a wireless signal from the mobile device, such as intensity of a received signal of the communicator 33. It is also possible to apply a method of acquiring information regarding received electric power from the mobile device via the communicator 33, and detecting a region in which the power receiver is positioned on the basis of a difference between the received electric power and transmitted electric power of the power transmitter 32. If it is known where the power receiver is disposed in the mobile device (e.g., in the middle), the position detector 37 may detect the position of the power receiver on the basis of the position of the mobile device.

The current output circuit 34 may output an alternating current to the power transmitter 32 at a current value controlled by the controller 36. The outputted alternating current may cause the power transmitter 32 to generate an electromagnetic field for electric power transmission.

Figure 2A:
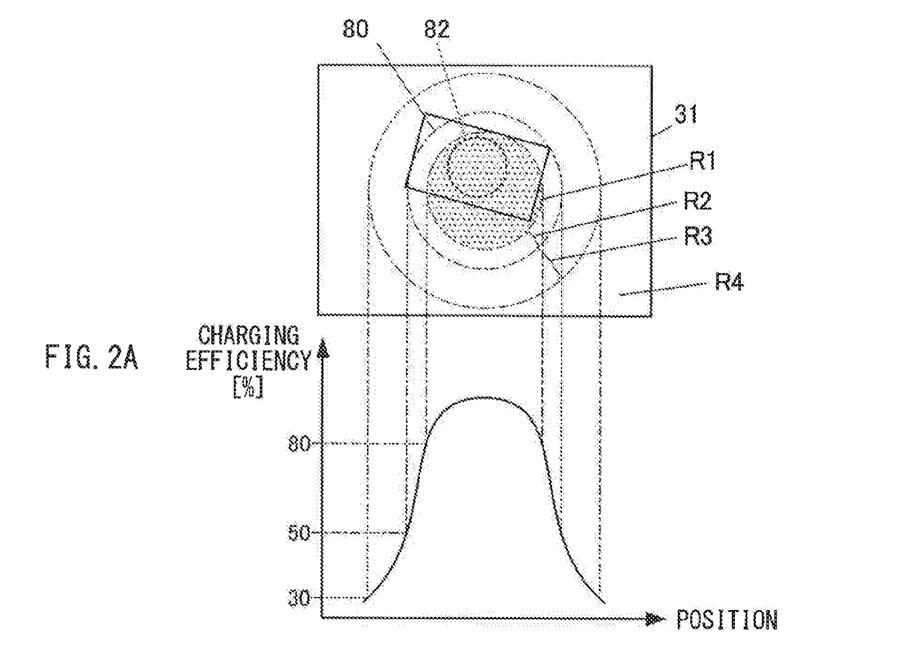
Figure 2B:
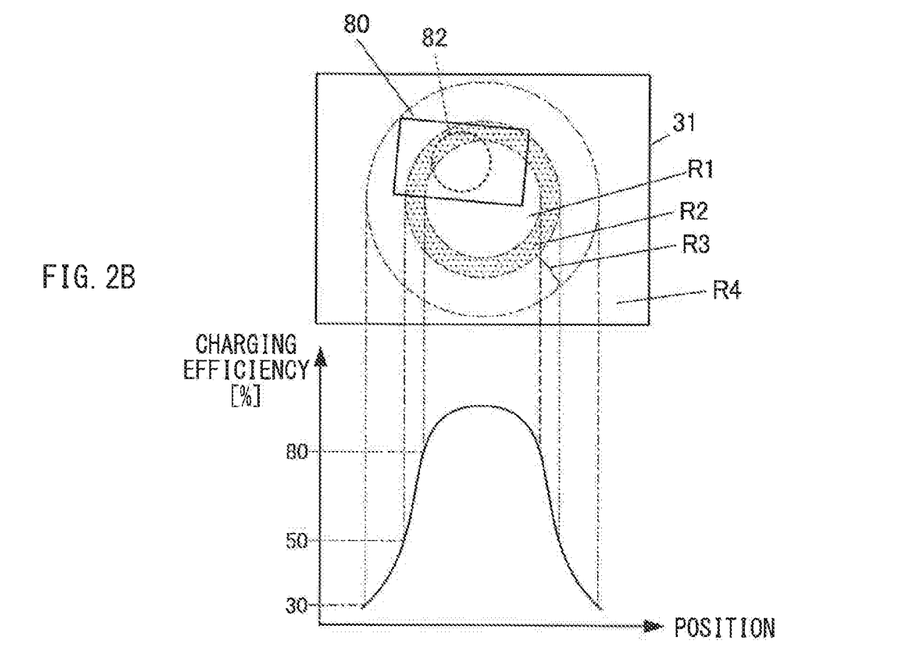

FIGS. 2A and 2B are diagrams each illustrating a relationship between the position of the mobile device and charging efficiency. FIG. 2A illustrates a mounting example in which the mobile device is chargeable in the normal mode, and FIG. 2B illustrates a mounting example in which the mobile device is chargeable in the enlargement mode.

The mounting unit 31 of the wireless charging device 30 may have a larger area than a mobile device 80, allowing the mobile device 80 to be displaceable on the mounting unit 31. The mounting unit 31 may include a region that is strongly subjected to the electromagnetic field generated by the power transmitter 32, and a region that is weakly subjected to the electromagnetic field. For example, the electromagnetic field is strongly applied to a middle region that is near the power transmitter 32, and the applied electromagnetic field decreases toward the periphery. The region strongly subjected to the electromagnetic field provides high charging efficiency, and the region weakly subjected to the electromagnetic field provides lower charging efficiency. On the mounting unit 31 may be set a standard region R1 in which the charging efficiency is a standard value (e.g., 80% or more), and an enlarged region R2 that is present outside the standard region R1 and provides lower charging efficiency (e.g., 50% to 80%). In addition, the mounting unit 31 may include a low-efficiency region R3 that is present outside the enlarged region R2 and provides even lower charging efficiency (e.g., 30% to 50%), and a charging difficulty region R4 that is present outside the low-efficiency region R3 and provides efficiency with which charging is difficult (e.g., 0% to 30%).

The example embodiment assumes that if, of the power receiver (power receiving coil) 82 of the mobile device 80, a portion farthest from the middle of the power transmitter 32 is positioned in a given region of the mounting unit 31, charging efficiency for the given region is obtained. However, definition of each region is not limited to this example.

For example, each region may be defined on the assumption that, if the middle of the power receiver 82 or a portion of the power receiver 82 that is nearest to the middle of the power transmitter 32 is positioned in a given region of the mounting unit 31, charging efficiency for the given region is obtained. According to some embodiments, a position of the power receiver 82 that allows charging efficiency for a given region to be obtained may be expressed as "the power receiver 82 is positioned in the given region". Moreover, in regard to a given region, "inside the region" may refer to a region that includes the given region and a region inside the given region. In regard to a given region, "outside the region" may refer to a region outside the given region (i.e., a region that is closer to the outer circumference than the given region is). FIG. 2A illustrates a state where the power receiver 82 of the mobile device 80 is positioned in the standard region R1, and the standard charging efficiency (80% or more) is obtained. FIG. 2B illustrates a state where the power receiver 82 of the mobile device 80 is positioned in the enlarged region R2, and lower charging efficiency (50% to 80%) is obtained.

The controller 36 of the wireless charging device 30 is able to selectively switch between a plurality of charging modes. The plurality of charging modes includes the normal mode of performing electric power transmission in a case where the power receiver 82 of the mobile device 80 is positioned in the standard region R1, and the enlargement mode of performing electric power transmission in a case where the power receiver 82 of the mobile device 80 is positioned inside the enlarged region R2. Furthermore, the enlargement mode includes the standard current mode in which a standard current is outputted to the power transmitter 32, and the increased current mode in which a current larger than the standard current is outputted. The current value in the increased current mode may be set, for example, to a current value that, even if charging efficiency decreases, enables electric power equivalent to that during standard charging to be transmitted to the power receiver 82. In other words, the current value in the increased current mode may be set to a current value that enables transmission of electric power including additional electric power that compensates for a decrease in charging efficiency.

The controller 36 of the wireless charging device 30 may receive a request from the device management unit 28 via the input/output port 35, and switch the charging mode on the basis of the received request.

<Charging Mode Control Process>

Figure 3:
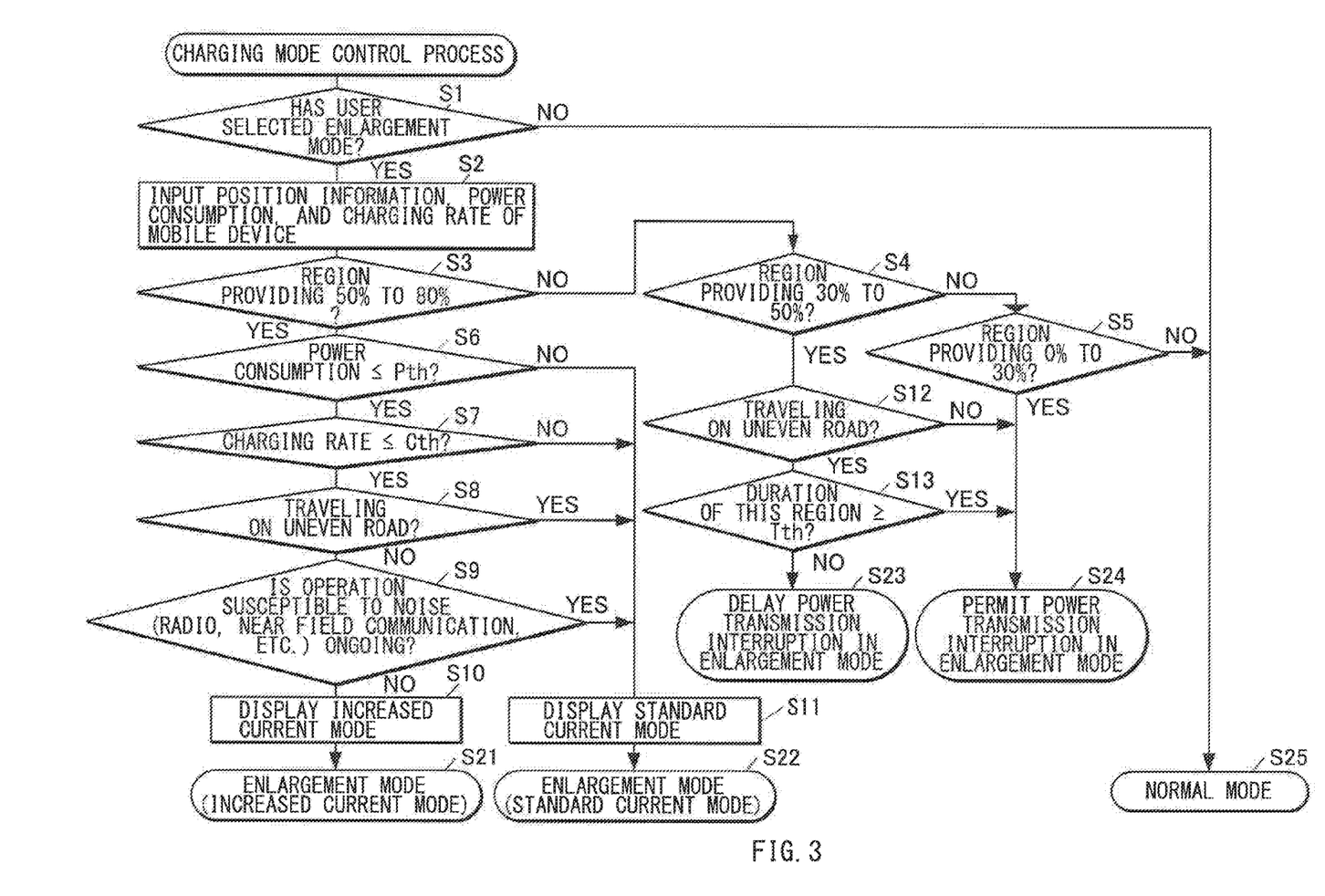
FIG. 3 is a flowchart illustrating a charging mode control process to be executed by a device management unit.

FIG. 3 is a flowchart illustrating a charging mode control process to be executed by the device management unit 28. While the wireless charging device 30 is being driven, the device management unit 28 may repeatedly execute the charging mode control process illustrated in FIG. 3 every predetermined control cycle (e.g., every 10 seconds), for example.

Upon start of the charging mode control process, the device management unit 28 may first determine whether a user (the occupant of the vehicle 1) has set the enlargement mode as selectable via the device operation unit 22 (step S1). In a case where the user has not set the enlargement mode as selectable (NO in step S1), the device management unit 28 may select the normal mode as the charging mode to be requested (step S25). Upon selection of the normal mode, the device management unit 28 may transmit a request for the normal mode to the controller 36 of the wireless charging device 30, and the controller 36 may drive the wireless charging device 30 in the requested normal mode. During driving in the normal mode, electric power transmission may be performed at the standard current if the power receiver 82 of the mobile device 80 is present in the standard region R1, whereas electric power transmission may be stopped if the power receiver 82 of the mobile device 80 is displaced outside the standard region R1.

As a result of step S1, if the enlargement mode has been set as selectable (YES in step S1), the device management unit 28 may receive, from the controller 36 of the wireless charging device 30, input of position information of the power receiver 82 of the mobile device 80 on the mounting unit 31, information regarding the present power consumption of the mobile device 80, and information regarding the present charging rate of the mobile device 80 (step S2). The position information may be obtained from the detection result of the position detector 37, and the information regarding the power consumption and the information regarding the charging rate may be obtained by communication with the mobile device 80 via the communicator 33.

Thereafter, the device management unit 28 may perform a branch process based on the position information of the mobile device 80 received in step S2. In other words, the device management unit 28 may perform determination of whether the power receiver 82 of the mobile device 80 is positioned in the enlarged region R2 providing a charging efficiency of 50% to 80% (step S3), determination of whether the power receiver 82 is positioned in the low-efficiency region R3 providing a charging efficiency of 30% to 50% (step S4), and determination of whether the power receiver 82 is positioned in the charging difficulty region R4 providing a charging efficiency of 0% to 30% (step S5), and cause the process to branch to a step based on each region.

As a result of the branch process (steps S3 to S5), if the power receiver 82 of the mobile device 80 is present in the standard region R1 and the process branches to NO in step S5, the device management unit 28 may select the normal mode (step S25). Upon selection of the normal mode, the device management unit 28 may transmit a request for the normal mode to the controller 36 of the wireless charging device 30. The controller 36 may drive the wireless charging device 30 in the requested normal mode.

As a result of the branch process (steps S3 to S5), if the power receiver 82 of the mobile device 80 is present in the enlarged region R2 and the process branches to YES in step S3, the device management unit 28 may determine, in steps S6 to S9, whether the present situation is suitable or unsuitable for the increased current mode.

In step S6, the device management unit 28 may determine whether the present power consumption of the mobile device 80 is equal to or less than a threshold Pth. A state where the power consumption is greater than the threshold Pth may indicate a state where the mobile device 80 is generating heat by being driven under heavy load. Flow of a large charging current is unfavorable while the mobile device 80 is generating heat. Such a case where the determination result is NO in step S6 may correspond to a situation unsuitable for the increased current mode.

In step S7, the device management unit 28 may determine whether the present charging rate of the mobile device 80 is equal to or less than a threshold Cth. If the charging rate is greater than the threshold Cth, urgency of charging is not so high, and it is thus determinable that a large charging current is unnecessary. Such a case where the determination result is NO in step S7 may correspond to a situation unsuitable for the increased current mode.

In step S8, the device management unit 28 may determine whether the vehicle 1 is traveling on an uneven road. While the vehicle 1 is traveling on an uneven road may correspond to a traveling state or a road situation in which traveling is determined to cause displacement of the mobile device 80 on the mounting unit 31. Traveling causing displacement of the mobile device 80 may indicate inertial force or vibration due to the traveling causing displacement of the mobile device 80. This determination may be made on the basis of a signal from the acceleration sensor 24, for example, or may be made on the basis of information regarding a road on which the vehicle 1 is traveling (e.g., that the vehicle 1 is traveling across a railroad crossing) received from the navigation system 23. While the vehicle 1 is traveling on an uneven road, vibration can cause the mobile device 80 to be displaced on the mounting unit 31 to move to the standard region R1. In a case where the power receiver 82 of the mobile device 80 is positioned in the standard region R1, the increased current mode can cause an excessive charging current to be transmitted to the mobile device 80. Such a case where the determination result is YES in step S8 may correspond to a situation unsuitable for the increased current mode.

In step S9, the device management unit 28 may determine whether wireless operation is ongoing. Normal wireless operation can be inhibited by electromagnetic noise, i.e., leakage of an electromagnetic field from the power transmitter 32. Examples of the wireless operation may include radio reception of the navigation system 23, and connection of near-field communication between the navigation system 23 and the mobile device 80. Such a case where the determination result is YES in step S9 may correspond to a situation unsuitable for the increased current mode.

In a case where the present situation is determined to be unsuitable for the increased current mode in at least one of the determination processes in steps S6 to S9, the device management unit 28 may prohibit switching to the increased current mode. The device management unit 28 may first cause the charging mode display 21*a* to perform display output of the standard current mode (step S11), and thereafter may select the standard current mode of the enlargement mode as the charging mode to be requested (step S22). In a case where the display output of the standard current mode has already been performed and the standard current mode has been selected, the display output and the selection may be continued. Upon selection of the standard current mode, the device management unit 28 may transmit a request for the standard current mode to the controller 36 of the wireless charging device 30, and the controller 36 may drive the wireless charging device 30 in the requested standard current mode of the enlargement mode.

In a case where the present situation is determined to be suitable for the increased current mode in all of steps S6 to S9, the device management unit 28 may permit switching to the increased current mode. The device management unit 28 may cause the charging mode display 21*a* to perform display output of the increased current mode (step S10), and thereafter may select the increased current mode of the enlargement mode as the charging mode to be requested (step S21). In a case where the display output of the increased current mode has already been performed and the increased current mode has been selected, the display output and the selection may be continued. Upon selection of the increased current mode, the device management unit 28 may transmit a request for the increased current mode to the controller 36 of the wireless charging device 30, and the controller 36 may drive the wireless charging device 30 in the requested increased current mode of the enlargement mode.

In a case where the increased current mode is selected in step S21, conditions for the selection may include, in addition to that a situation unsuitable for the increased current mode is excluded in steps S6 to S9, that the power receiver 82 of the mobile device 80 is positioned in the enlarged region R2 in step S3. In a case where the power receiver 82 of the mobile device 80 is positioned in the standard region R1, the increased current mode can cause an excessive charging current to be transmitted to the mobile device 80. The determination process in step S3 suppresses such concern.

As a result of the branch process (steps S3 to S5), if the power receiver 82 of the mobile device 80 is present in the low-efficiency region R3 and the process branches to YES in step S4, the device management unit 28 may determine whether the vehicle 1 is traveling on an uneven road (step S12). Furthermore, the device management unit 28 may determine whether the power receiver 82 has been continuously present in the low-efficiency region R3 for threshold time Tth or longer (step S13). Such duration may be counted by using a counter that continuously measures time throughout a plurality of times of charging mode control processes.

If the determination result is YES in step S12 and NO in step S13, the device management unit 28 may select a request to delay power transmission interruption in the enlargement mode based on movement of the power receiver 82 outside the enlarged region R2 (step S23). This request may be transmitted to the controller 36 of the wireless charging device 30. Upon accepting the request for delay of power transmission interruption, the controller 36 of the wireless charging device 30 may delay a process of interrupting power transmission, without immediately performing the process of interruption, even if the power receiver 82 moves outside the enlarged region R2 in the enlargement mode.

If the determination result is NO in step S12 or YES in step S13, the device management unit 28 may select permission for power transmission interruption in the enlargement mode based on movement of the power receiver 82 outside the enlarged region R2 (step S24). The permission for power transmission interruption may be transmitted to the controller 36 of the wireless charging device 30. Upon accepting the permission for power transmission interruption, the controller 36 of the wireless charging device 30 may, in a case where power transmission interruption in the enlargement mode has been delayed, cancel the delay and execute the process of power transmission interruption.

In a case where the enlargement mode is selected by the user, it is assumed that an improvement in charging speed of the mobile device 80 is desired. In response to the request for delay in step S23, interruption of power transmission in the enlargement mode may be skipped in a situation in which the mobile device 80 is displaced temporarily during traveling involving much vibration and is highly likely to return to the original position again. This contributes to an improvement in charging speed of the mobile device 80. Furthermore, in response to the permission for interruption of power transmission in step S24, power transmission may be interrupted in a case where the mobile device 80 is likely to return to the enlarged region R2 again but does not return for a long time during traveling involving much vibration. This makes it possible to suppress continuation of power transmission for a long time in a state where charging efficiency is poor.

As a result of the branch process (steps S3 to S5), if the power receiver 82 of the mobile device 80 is present in the charging difficulty region R4 and the process branches to YES in step S5, the device management unit 28 may select permission for power transmission interruption in the enlargement mode based on movement of the power receiver 82 outside the enlarged region R2 (step S24). In a case where the position of the mobile device 80 is greatly deviated, or in a case where charging becomes unnecessary and the user moves the mobile device 80 to an edge on the mounting unit 31, the control in steps S5 and S24 makes it possible to suppress continuation of output of the electromagnetic field from the power transmitter 32 in a situation in which charging efficiency is very low.

The above-described charging mode control process may be executed repeatedly, and thus the charging mode of the wireless charging device 30 may be switched as appropriate on the basis of a selection situation of the charging mode by the occupant, a traveling situation of the vehicle 1, and a state of the mobile device 80, for example. This enables wireless charging of the mobile device 80.

As described above, according to the vehicle 1 and the wireless charging device 30 of the example embodiment, the switchable charging mode of wireless charging includes the normal mode and the enlargement mode. Furthermore, the enlargement mode includes the standard current mode and the increased current mode. Therefore, in the vehicle 1 in which the position of the mobile device 80 tends to be deviated, the normal mode may allow normal wireless charging of the mobile device 80 if no position deviation occurs, and the enlargement mode may allow wireless charging of the mobile device 80 if position deviation occurs. Meanwhile, in wireless charging in a state where the position of the mobile device 80 is deviated in the enlargement mode, a decrease in charging efficiency can cause the charging speed to decrease, or an electromagnetic field that leaks from the power transmitter 32 can affect the exterior. Hence, the increased current mode may be selected depending on a situation, which makes it possible to compensate for a decrease in charging efficiency by an increase in current to improve the charging speed. Moreover, the standard current mode may be selected depending on a situation, which makes it possible to suppress an electromagnetic field leaking from the power transmitter 32 to affect the exterior.

Furthermore, according to the vehicle 1 and the wireless charging device 30 of the example embodiment, the device management unit 28 may be configured to switch the charging mode to the increased current mode in a case where the power receiver 82 of the mobile device 80 is positioned in the enlarged region R2 (YES in step S3, i.e., a case where the power receiver 82 is positioned inside the enlarged region R2 and outside the standard region R1). In other words, the charging mode may not be switched to the increased current mode in a case where the power receiver 82 is positioned in the standard region R1. This makes it possible to suppress occurrence of, for example, an event in which transmitted electric power is increased and an excessive charging current flows to the power receiver 82 in a case where the power receiver 82 is positioned in the standard region R1.

Furthermore, according to the wireless charging device 30 of the example embodiment, the controller 36 may switch the charging mode on the basis of a request from the device management unit 28 received via the input/output port 35. Such a configuration enables the device management unit 28 of the vehicle 1 to easily control switching of the charging mode on the basis of the traveling situation of the vehicle 1 by using a device (the device operation unit 22) included in the vehicle 1.

Furthermore, according to the vehicle 1 and the wireless charging device 30 of the example embodiment, details of control to be performed by the wireless charging device 30 may be switched on the basis of the traveling state of the vehicle 1 or the road situation, e.g., whether the road causes much vibration (see step S8 or S12 in FIG. 3). This enables charging control based on whether the present situation is a situation in which the mobile device 80 is likely to move frequently on the mounting unit 31 or a situation in which the mobile device 80 is less likely to move frequently.

In one example, according to the vehicle 1 and the wireless charging device 30 of the example embodiment, switching from the standard current mode to the increased current mode may be prohibited during traveling that is determined to cause displacement of the mobile device 80, e.g., while the vehicle 1 is traveling on an uneven road (see step S8 in FIG. 3). Such a configuration makes it possible to suppress the charging mode being set to the increased current mode and an excessive charging current flowing to the mobile device 80 in a case where vibration causes the mobile device 80 to return to the standard region R1.

In another example, according to the vehicle 1 and the wireless charging device 30 of the example embodiment, during traveling that is determined to cause displacement of the mobile device 80, e.g., while the vehicle 1 is traveling on an uneven road, power transmission interruption in the enlargement mode may be delayed even if the mobile device 80 moves from the enlarged region R2 to the low-efficiency region R3 (see steps S12, S13, and S23 in FIG. 3). Such a configuration prevents power transmission from being interrupted each time in a case where the enlargement mode is selected to hasten charging of the mobile device 80 and vibration causes the mobile device 80 to go back and forth between the enlarged region R2 and the low-efficiency region R3. This contributes to an improvement in charging speed of the mobile device 80.

Furthermore, according to the vehicle 1 and the wireless charging device 30 of the example embodiment, switching to the enlargement mode may be allowed in a case where the occupant has set the enlargement mode as selectable (see step S1 in FIG. 3). Such a configuration makes it possible to address a case where leakage of an electromagnetic field from the power transmitter 32 is undesired, on the basis of the occupant's intention, because the charging mode is not switched to the enlargement mode unless the occupant selects the enlargement mode.

Furthermore, according to the vehicle 1 and the wireless charging device 30 of the example embodiment, whether to permit switching to the increased current mode may be determined on the basis of a situation of operation that is susceptible to electromagnetic noise, e.g., radio reception or connection of near-field communication (see step S9 in FIG. 3). This enables switching of the charging mode in consideration of the effect of electromagnetic noise.

Furthermore, according to the vehicle 1 and the wireless charging device 30 of the example embodiment, whether to permit switching to the increased current mode may be determined on the basis of the power consumption and the charging rate of the mobile device 80 (see steps S6 and S7 in FIG. 3). This makes it possible to suppress abnormal heat generation of the mobile device 80, or suppress an unnecessary improvement in charging speed.

Furthermore, according to the vehicle 1 and the wireless charging device 30 of the example embodiment, a situation of switching between the standard current mode and the increased current mode may be displayed on the charging mode display 21*a* of the display panel 21. This enables the occupant to recognize an amount of outputted electric power that is automatically switched during the enlargement mode. On the basis of recognition of the amount of outputted electric power, it is possible for the occupant to predict an amount of charging of the mobile device 80, recognize presence or absence and a magnitude of leakage of an electromagnetic field from the power transmitter 32, or correct the position of the mobile device 80.

Some example embodiments of the technology have been described above. However, the technology is not limited to the foregoing example embodiments. For example, some example embodiments describe a configuration in which the device management unit 28 of the vehicle 1 selects the charging mode. However, a configuration may be adopted in which the charging mode is selected by the controller 36 of the wireless charging device 30. In this case, for example, the device management unit 28 may transmit, to the controller 36 via the input/output port 35, information regarding the traveling situation of the vehicle 1 and information regarding the selection situation by the occupant, and the controller 36 may execute the processes in step S3 to S13 and S21 to S25 in FIG. 3.

Some example embodiments describe the vehicle 1 mounted with the wireless charging device 30. However, a vehicle according to any embodiment of the technology may also include a vehicle that is unmounted with and optionally mountable with a wireless charging device. In other words, a vehicle according to any embodiment of the technology may have a configuration not including a wireless charging device yet, as long as the vehicle includes a control device that, if a wireless charging device is mounted, communicates with the wireless charging device and switches the charging mode of the wireless charging device.

Some example embodiments describe while the vehicle 1 is traveling on an uneven road as an example of the traveling state or the road situation in which traveling is determined to cause displacement of the mobile device 80. However, the traveling state or the road situation in which the above determination is made may be, for example, a traveling state where a sports mode with high responsiveness of steering and acceleration, for example, is selected as a traveling mode of the vehicle, or a traveling state where a rough road traveling mode is selected. It is also possible to apply a traveling state involving much sudden steering or sudden acceleration or deceleration, i.e., a traveling state with high driving intensity, or a traveling state involving constant or frequent operation of an antilock brake system (ABS) and a traction control system (TCS). Traveling with high driving intensity may be determined on the basis of progression of acceleration or deceleration detected by an acceleration sensor or lateral G (inertial force in a lateral direction), or progression of an amount of operation of a steering wheel, an accelerator pedal, or a brake pedal, for example.

Furthermore, some example embodiments describe an example in which setting to make the enlargement mode selectable is performed by the occupant. However, setting to make the enlargement mode selectable may be performed automatically depending on the charging rate of the mobile device. In addition, some example embodiments describe an example in which the increased current mode and the standard current mode during the enlargement mode are switched by the control process depending on conditions. However, a configuration in which the modes are switched on the basis of an operation by the occupant may be adopted. In such a configuration, the occupant can perform an operation of switching to the increased current mode in a situation in which the increased current mode is prohibited, or the situation can transition to a situation in which the increased current mode is prohibited after the occupant has performed an operation of switching to the increased current mode. In that case, the switching operation by the occupant may be rejected, and display indicating the rejection may be outputted to the display panel. In addition, details described in the example embodiments may be varied as appropriate without departing from the scope of the technology. Examples of such details may include the charging efficiency for each of the standard region and the enlarged region, and details and the number of conditions in prohibiting switching to the increased current mode.

According to at least one embodiment of the technology, the normal mode allows normal charging to be performed if the position of the mobile device is not deviated. Furthermore, even if position deviation of the mobile device occurs, the enlargement mode allows charging to be continued. Meanwhile, in a case where charging is performed in the enlargement mode in a state where position deviation has occurred, charging efficiency of the mobile device decreases, which can cause the charging speed to decrease, or an electromagnetic field that leaks from the power transmitter can affect the exterior. Hence, according to at least one embodiment of the technology, the standard current mode and the increased current mode are switchable in the enlargement mode. This makes it possible to suppress a decrease in charging speed of the mobile device in the increased current mode, depending on a situation, or suppress an electromagnetic field leaking to affect the exterior in the standard current mode, depending on a situation. This makes it possible to address position deviation of the mobile device as appropriate, enabling wireless charging of the mobile device.

The controller 36 and/or the device management unit 28 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 36 and/or the device management unit 28. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 36 and/or the device management unit 28 illustrated in FIG. 1.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

The invention claimed is:

1. A wireless charging device for a vehicle, the wireless charging device being configured to charge a mobile device including a power receiver, the wireless charging device comprising:
   a mounting unit to be mounted with the mobile device;
   a power transmitter configured to wirelessly transmit electric power to the power receiver of the mobile device;
   a position detector configured to detect a position of the power receiver of the mobile device mounted on the mounting unit; and
   a controller configured to switch between a plurality of charging modes based on the detected position of the power receiver of the mobile device by the position detector,
   wherein the plurality of charging modes switchable by the controller includes a normal mode and a plurality of enlargement modes, the plurality of enlargement modes including a standard current mode and an increased current mode,
   wherein the normal mode:
      1) allowing charging in a case where the power receiver of the mobile device is positioned in a standard region of the mounting unit; and
      2) disallowing the charging in a case where the power receiver of the mobile device is positioned outside the standard region, the standard region being defined based on a location of the power transmitter,
   wherein the standard current mode:
      1) allowing the charging in which a standard current is outputted to the power transmitter in a case where the power receiver of the mobile device is positioned in the standard region or an enlarged region; and
      2) disallowing the charging in a case where the power receiver of the mobile device is positioned outside the enlarged region, the enlarged region being outside of the standard region and surrounds the first region, and
   wherein the increased current mode:
      1) allowing the charging in which an increased current is outputted to the power transmitter in a case where the power receiver of the mobile device is positioned in the enlarged region;
      2) allowing the charging in which the standard current is outputted to the power transmitter in a case where the power receiver of the mobile device is positioned in the standard region; and
      3) disallowing the charging in a case where the power receiver of the mobile device is positioned outside the enlarged region, the increased current being larger than the standard current.

2. The wireless charging device according to claim 1, wherein the standard region provides a charging efficiency of equal to or greater than a first value, and
   wherein the enlarged region provides a charging efficiency of less than the first value and equal to or greater than a second value.

3. The wireless charging device according to claim 1, further comprising an input/output port couplable to a control device of the vehicle,
   wherein the controller is configured to switch between the plurality of charging modes on a basis of a request received via the input/output port.

4. The wireless charging device according to claim 2, further comprising an input/output port couplable to a control device of the vehicle,
   wherein the controller is configured to switch between the plurality of charging modes on a basis of a request received via the input/output port.

5. A vehicle mountable with a wireless charging device that includes a mounting unit to be mounted with a mobile device including a power receiver, a position detector to detect a position of the power receiver of the mobile device, and a power transmitter configured to wirelessly transmit electric power to the power receiver of the mobile device, the vehicle comprising
   a control device configured to switch between a plurality of charging modes of the wireless charging device based on the detected position of the power receiver of the mobile device by the position detector of the wireless charging device,
   wherein the plurality of charging modes switchable by the control device includes a normal mode and a plurality of enlargement modes, the plurality of enlargement modes includes a standard current mode and an increased current mode,
   wherein the normal mode:
      1) allowing charging in a case where the power receiver of the mobile device is positioned in a standard region of the mounting unit; and
      2) disallowing the charging in a case where the power receiver of the mobile device is positioned outside the standard region, the standard region being defined based on a location of the power transmitter,
   wherein the standard current mode:
      1) allowing the charging in which a standard current is outputted to the power transmitter in a case where the power receiver of the mobile device is positioned in the standard region or an enlarged region; and
      2) disallowing the charging in a case where the power receiver of the mobile device is positioned outside the enlarged region, the enlarged region being outside of the standard region and surrounds the first region, and
   wherein the increased current mode:
      1) allowing the charging in which an increased current is outputted to the power transmitter in a case where the power receiver of the mobile device is positioned in the enlarged region;
      2) allowing the charging in which the standard current is outputted to the power transmitter in a case where the power receiver of the mobile device is positioned in the standard region; and
      3) disallowing the charging in a case where the power receiver of the mobile device is positioned outside the enlarged region, the increased current is larger than the standard current.

6. The vehicle according to claim 5, wherein the standard region provides a charging efficiency of equal to or greater than a first value, and
   wherein the enlarged region provides a charging efficiency of less than the first value and equal to or greater than a second value.

7. The vehicle according to claim 5, wherein the control device is configured to switch the charging mode to be performed by the wireless charging device between the standard current mode and the increased current mode on a basis of a traveling state of the vehicle or a road situation.

8. The vehicle according to claim 6, wherein the control device is configured to switch the charging mode to be performed by the wireless charging device between the standard current mode and the increased current mode on a basis of a traveling state of the vehicle or a road situation.

9. The vehicle according to claim 7, wherein the control device is configured to prohibit switching from the standard current mode to the increased current mode in the traveling state or the road situation in which traveling of the vehicle is determined to cause displacement of the mobile device.

10. The vehicle according to claim 8, wherein the control device is configured to prohibit switching from the standard current mode to the increased current mode in the traveling state or the road situation in which traveling of the vehicle is determined to cause displacement of the mobile device.

11. The vehicle according to claim 7, wherein the control device is configured to delay interruption of the transmission of the electric power in the enlargement modes in a case where the mobile device moves outside the enlarged region from the enlarged region in the traveling state or the road situation in which traveling of the vehicle is determined to cause displacement of the mobile device.

12. The vehicle according to claim 9, wherein the control device is configured to delay interruption of the transmission of the electric power in the enlargement modes in a case where the mobile device moves outside the enlarged region from the enlarged region in the traveling state or the road situation in which traveling of the vehicle is determined to cause displacement of the mobile device.

13. The vehicle according to claim 6, further comprising an operation unit operable by an occupant to select the enlargement modes,
wherein the control device is configured to switch the charging mode to the enlargement modes in a case where the enlargement modes have been selected via the operation unit.

14. The vehicle according to claim 6, wherein the control device is configured to determine, on a basis of a situation of operation of the vehicle that is susceptible to electromagnetic noise, whether to permit switching from the standard current mode to the increased current mode.

15. The vehicle according to claim 6, wherein the control device is configured to determine, on a basis of power consumption, a charging rate, or both, of the mobile device, whether to permit switching from the standard current mode to the increased current mode.

16. The vehicle according to claim 6, further comprising a display panel,
wherein the control device is configured to cause the display panel to display a situation of switching between the standard current mode and the increased current mode.

17. The vehicle according to claim 5, wherein the control device is configured to determine whether the vehicle is traveling on an uneven road and to determine whether the detected position of the power receiver of the mobile device moves outside the enlarged region from the enlarged region,
wherein, when the control device determines that the vehicle is not traveling on the uneven road and the detected position of the power receiver of the mobile device moves outside the enlarged region from the enlarged region, the control device is configured to prohibit the charging immediately, and
wherein, when the control device determines that the vehicle is traveling on the uneven road and the detected position of the power receiver of the mobile device moves outside the enlarged region from the enlarged region, the control device is configured to prohibit the charging after a predetermined time.

18. The vehicle according to claim 6, wherein the control device is configured to determine whether the vehicle is traveling on an uneven road and to determine whether the detected position of the power receiver of the mobile device moves outside the enlarged region from the enlarged region,
wherein, when the control device determines that the vehicle is not traveling on the uneven road and the detected position of the power receiver of the mobile device moves outside the enlarged region from the enlarged region, the control device is configured to prohibit the charging immediately,
wherein, when the control device determines that the vehicle is traveling on the uneven road and the detected position of the power receiver of the mobile device moves outside the enlarged region from the enlarged region, the control device is configured to prohibit the charging after a predetermined time.

* * * * *